(12) United States Patent
Cho (10) Patent No.: US 12,265,397 B2
(45) Date of Patent: Apr. 1, 2025

(54) PLATOONING CONTROL DEVICE AND PLATOONING CONTROL METHOD

(71) Applicant: HYUNDAI MOBIS Co., Ltd., Seoul (KR)

(72) Inventor: Heung Rae Cho, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 211 days.

(21) Appl. No.: 18/079,444

(22) Filed: Dec. 12, 2022

(65) Prior Publication Data

US 2024/0069570 A1 Feb. 29, 2024

(30) Foreign Application Priority Data

Aug. 26, 2022 (KR) .......... 10-2022-0107758

(51) Int. Cl.
  *G05D 1/00* (2024.01)
  *B60W 60/00* (2020.01)
  *G08G 1/00* (2006.01)

(52) U.S. Cl.
  CPC .......... *G05D 1/0295* (2013.01); *B60W 60/001* (2020.02); *G08G 1/22* (2013.01); *B60W 2556/65* (2020.02)

(58) Field of Classification Search
  CPC ...... G05D 1/0295; G05D 1/243; G05D 1/695; G05D 2101/15; G05D 2107/13; G05D 2109/10; G05D 2111/10; B60W 60/001; B60W 2556/65; B60W 30/00; B60W 2050/0008; B60W 2420/403; B60W 2540/18; B60W 2720/106; B60W 30/10; B60W 30/165; B60W 10/18; B60W 10/20; B60W 40/02; B60W 40/107; B60W 2050/0002; G08G 1/22; G08G 1/096725; G08G 1/096741; G08G 1/096791;
(Continued)

(56) References Cited

U.S. PATENT DOCUMENTS 6,032,097 A 2/2000 Iihoshi et al.
10,635,915 B1 * 4/2020 Kim .................. G06F 18/24
(Continued)

FOREIGN PATENT DOCUMENTS

CN 105035085 A * 11/2015
CN 111301411 A * 6/2020 .......... B60W 30/165
JP 2023176420 A * 12/2023

OTHER PUBLICATIONS

Extended Search Report issued Aug. 11, 2023 for counterpart European Patent Application No. 22211624.6.

*Primary Examiner* — Isaac G Smith
*Assistant Examiner* — Nikki M Molina
(74) *Attorney, Agent, or Firm* — MORGAN, LEWIS & BOCKIUS LLP (57) ABSTRACT

A platooning control device includes: a learning device configured to perform reinforcement learning on the basis of image information and a feedback signal and to control a pertinent vehicle so as to follow a traveling trajectory of a front vehicle according to a result of the reinforcement learning; and a compensation determination unit configured to receive a coordinate of a control point regarding the traveling trajectory of the front vehicle from the front vehicle and to compare a coordinate of the pertinent vehicle with the coordinate of the control point, thereby generating the feedback signal.

14 Claims, 7 Drawing Sheets

(58) Field of Classification Search
CPC ........ G08G 1/161; G08G 1/163; G06N 3/006;
G06N 3/092; G06V 20/58; G06V 10/82
See application file for complete search history.

(56) References Cited

U.S. PATENT DOCUMENTS

| | | | |
|---|---|---|---|
| 2019/0079540 A1* | 3/2019 | Yoon ........................ | H04W 4/40 |
| 2019/0179330 A1* | 6/2019 | Oniwa ..................... | G08G 1/16 |
| 2023/0195843 A1* | 6/2023 | Kaneko .................. | G06N 3/006 |
| | | | 706/12 |

* cited by examiner

PLATOONING CONTROL DEVICE AND PLATOONING CONTROL METHOD

CROSS-REFERENCE TO RELATED APPLICATION(S)

This application is based on and claims priority under 35 U.S.C. 119 to Korean Patent Application No. 10-2022-0107758, filed on Aug. 26, 2022, in the Korean Intellectual Property Office, the disclosure of which is herein incorporated by reference in its entirety.

BACKGROUND OF THE INVENTION

1. Field of the Invention

The present disclosure relates to platooning control device and a platooning control method wherein reinforcement learning is performed so as to follow the traveling trajectory of a front vehicle during platooning.

2. Description of the Prior Art

In general, platooning refers to driving a group of multiple vehicles on roads while sharing traveling information with each other and considering external environments.

In order to conduct stable platooning, it is crucial to maintain appropriate distances between platooning vehicles and to control rear vehicles to follow the traveling trajectory of front vehicles.

An autonomous driving system may perform reinforcement learning regarding platooning such that autonomous driving vehicles take optimal actions during platooning.

The reinforcement learning is a machine learning method for learning which action, if taken, would give an optimal result in the current state through trial and error. A reward is given each time an action is taken, and the learning proceeds so as to maximize such rewards.

The above descriptions regarding background technologies have been made only to help understanding of the background of the present disclosure, and are not to be deemed by those skilled in the art to correspond to already-known prior arts.

SUMMARY OF THE INVENTION

Accordingly, it is an aspect of the present disclosure to perform reinforcement learning by using a control point regarding the traveling trajectory of a front vehicle and image information during platooning such that the pertinent vehicle follows the traveling trajectory of the front vehicle stably and efficiently.

The technical subjects pursued in the present disclosure may not be limited to the above mentioned technical subjects, and other technical subjects which are not mentioned may be clearly understood, through the following descriptions, by those skilled in the art to which the present disclosure pertains.

In accordance with an aspect of the present disclosure, a platooning control device may include: a learning device configured to perform reinforcement learning on the basis of image information and a feedback signal and to control a pertinent vehicle so as to follow a traveling trajectory of a front vehicle according to a result of the reinforcement learning; and a compensation determination unit configured to receive a coordinate of a control point regarding the traveling trajectory of the front vehicle from the front vehicle and to compare a coordinate of the pertinent vehicle with the coordinate of the control point, thereby generating the feedback signal.

In accordance with another aspect of the present disclosure, a platooning control method may include: controlling a pertinent vehicle so as to follow a traveling trajectory of a front vehicle according to a result of reinforcement learning performed on the basis of image information and a feedback signal; receiving a coordinate of a control point regarding the traveling trajectory of the front vehicle from the front vehicle; and generating the feedback signal by comparing a coordinate of the pertinent vehicle with the coordinate of the control point.

The present disclosure is advantageous in that reinforcement learning is performed by using a control point regarding the traveling trajectory of a front vehicle and image information during platooning such that the pertinent vehicle follows the traveling trajectory of the front vehicle stably and efficiently.

Advantageous effects obtainable from the present disclosure may not be limited to the above mentioned effects, and other effects which are not mentioned may be clearly understood, through the following descriptions, by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments disclosed in the present specification will be described in detail with reference to the accompanying drawings, and the same or similar elements are given the same and similar reference numerals, so duplicate descriptions thereof will be omitted.

In describing the embodiments disclosed in the present specification, when the detailed description of the relevant known technology is determined to unnecessarily obscure the gist of the present disclosure, the detailed description may be omitted. Further, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Figure 1:
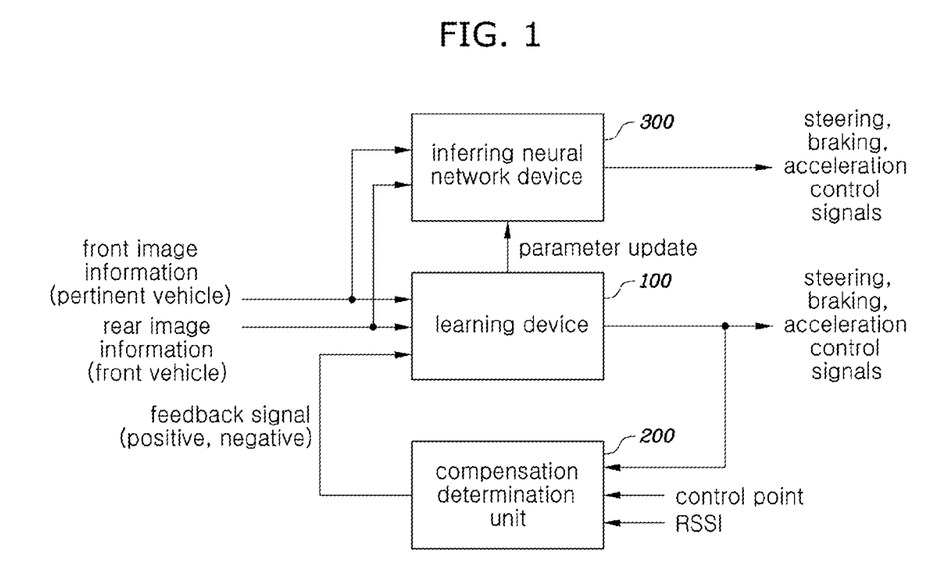
FIG. 1 is a block diagram illustrating an exemplary configuration of a platooning control device according to an embodiment of the present disclosure.

FIG. 1 is a block diagram illustrating an exemplary configuration of a platooning control device according to an embodiment of the present disclosure.

As illustrated in FIG. 1, the platooning control device may include a learning device 100, a compensation determination unit 200, and an inferring neural network device 300.

The platooning control device according to an embodiment of the present disclosure may perform reinforcement learning by using the traveling trajectory of a front vehicle and image information during platooning such that the pertinent vehicle is controlled to follow the traveling trajectory of the front vehicle stably and efficiently.

Respective components of the platooning control device will now be described.

The learning device 100 may correspond to an agent which is the target of reinforcement learning regarding platooning.

The learning device 100 may perform reinforcement learning through a neural network on the basis of image information and a feedback signal, and may output a steering control signal, a braking control signal, and an acceleration control signal such that the pertinent vehicle is controlled to follow the traveling trajectory of the front vehicle according to the result of reinforcement learning.

The image information may include front image information output from a front camera of the pertinent vehicle, and rear image information output from a rear camera of the front vehicle. The front image information and the rear image information may correspond to platooning-related states, and may reflect the characteristics of the real road along which the pertinent vehicle is traveling. Accordingly, the learning device 100 may perform reinforcement learning through front image information and rear image information corresponding to the current platooning state such that, even in an exceptional platooning situation, the pertinent vehicle is controlled to safely follow the traveling trajectory of the front vehicle.

The feedback signal may correspond to a reward regarding reinforcement learning. More particularly, the feedback signal may indicate one of positive feedback and negative feedback regarding whether the pertinent vehicle follows the traveling trajectory of the front car. Accordingly, the learning device 100 may change and modify the policy regarding reinforcement learning according to the feedback signal.

The steering control signal, the braking control signal, and the acceleration control signal may correspond to actions regarding reinforcement learning, and may be generated to perform steering control, braking control, and acceleration control of the pertinent vehicle.

More particularly, the learning device 100 may transfer a control signal necessary for traveling of the pertinent vehicle to traveling-related controllers for steering, braking, driving, and the like, thereby controlling the traveling state of the pertinent vehicle.

For example, the learning device 100 may output a steering control signal to a steering controller (not illustrated) configured to adjust the rotational angle of the steering wheel, for example, thereby controlling the steering angle of the pertinent vehicle, and may output a braking control signal to a braking controller (not illustrated) configured to adjust the amount of hydraulic braking or to a motor controller (not illustrated) configured to adjust the amount of regenerative braking, thereby controlling the amount of braking of the pertinent vehicle. In addition, the learning device 100 may output an acceleration control signal to a powertrain controller (not illustrated) configured to adjust the output torque of the electric motor or engine, thereby controlling the acceleration of the pertinent vehicle.

The compensation determination unit 200 may generate a feedback signal corresponding to a reward regarding reinforcement learning on the basis of a steering control signal, a braking control signal, and an acceleration control signal corresponding to actions regarding reinforcement learning.

In addition, compensation determination unit 200 may receive the coordinate of a control point regarding the traveling trajectory of the front vehicle from the front vehicle, and may compare the coordinate of the pertinent vehicle with the coordinate of the control point, thereby generating a feedback signal.

In the present embodiment, the control point may be defined as a feature point for controlling the shape of a spline curve corresponding to the traveling trajectory of the front vehicle.

The spline curve may correspond to a smooth curve for expressing the traveling trajectory of the front vehicle by using a spline function. Depending on the embodiment, the spline curve may correspond to one of an interpolating spline curve extending through control points, or an approximating spline curve not extending through intermediate control points. A different configuration may be made, depending on the embodiment, regarding whether the approximating spline curve extends through the starting control point and the ending control point.

A method for operating the compensation determination unit 200 so as to generate a feedback signal, assuming that the spline curve corresponding to the traveling trajectory of the front vehicle corresponds to an approximating spline curve, will now be described.

When the coordinate of the pertinent vehicle is on the outside of the traveling lane in comparison with the coordinate of a control point, the compensation determination unit 200 may determine that the pertinent vehicle has deviated from the traveling trajectory of the front vehicle toward the control point, and may output a feedback signal corresponding to negative feedback. The traveling lane refers to the lane along which the pertinent vehicle is currently traveling.

In addition, when the coordinate of the pertinent vehicle is out of a preconfigured danger distance from the coordinate of the control point, the compensation determination unit 200 may determine that the pertinent vehicle has deviated from the traveling trajectory of the front vehicle in the opposite direction to the control point, and may output a feedback signal corresponding to negative feedback.

When negative feedback is input as a result of coordinate comparison between the pertinent vehicle and the control point, the learning device 100 may control the amount of braking of the pertinent vehicle to increase through a braking control signal, and may control the steering angle of the pertinent vehicle to follow the traveling trajectory of the front vehicle through a steering control signal.

To the contrary, if the coordinate of the pertinent vehicle is on the inside of the traveling lane in comparison with the control point coordinate, and if the coordinate of the pertinent vehicle is within the preconfigured danger distance from the coordinate of the control point, the compensation determination unit 200 may determine the pertinent vehicle stably follows the traveling trajectory of the front vehicle. In this case, the compensation determination unit 200 may output a feedback signal corresponding to positive feedback.

Accordingly, the compensation determination unit 200 according to the present embodiment may provide the learning device 100 with feedback regarding whether the pertinent vehicle follows the traveling trajectory of the front vehicle on the basis of the coordinate of a control point regarding the traveling trajectory of the front vehicle, thereby reducing the data size and the amount of calculation regarding the traveling trajectory of the front vehicle.

In addition, the compensation determination unit 200 may generate a feedback signal according to whether the radio signal strength (for example, received signal strength indication (RSSI)) of a radio signal received from the front vehicle is included in a preconfigured range. The preconfigured range regarding the RSSI may be variously configured depending on the embodiment.

The RSSI of the radio signal may indicate the inter-vehicle distance between the pertinent vehicle and the front vehicle. For example, the compensation determination unit 200 may determine that the higher the RSSI, the shorter the inter-vehicle distance between the pertinent vehicle and the front vehicle.

If the RSSI of the radio signal is included in the preconfigured range, the compensation determination unit 200 may determine that the pertinent vehicle stably maintains the inter-vehicle distance from the front vehicle, and may output a feedback signal corresponding to positive feedback.

To the contrary, if the RSSI of the radio signal is not included in the preconfigured range, the compensation determination unit 200 may output a feedback signal corresponding to negative feedback.

More particularly, if the RSSI of the radio signal is higher than the upper threshold of the preconfigured range, the compensation determination unit 200 may determine that the inter-vehicle distance between the pertinent vehicle and the front vehicle is short, and may output a feedback signal corresponding to negative feedback. The learning device 100 may control the amount of braking of the pertinent vehicle to increase through a braking control signal.

To the contrary, if the RSSI of the radio signal is lower than the lower threshold of the preconfigured range, the compensation determination unit 200 may determine that the inter-vehicle distance between the pertinent vehicle and the front vehicle is long, and may output a feedback signal corresponding to negative feedback. The learning device 100 may control the acceleration of the pertinent vehicle to increase through an acceleration control signal.

Accordingly, the compensation determination unit 200 according to the present embodiment may provide the learning device 100 with feedback regarding whether the inter-vehicle distance between the pertinent vehicle and the front vehicle is stably maintained through the RSSI of the radio signal, thereby controlling the learning device 100 to learn acceleration and braking characteristics regarding the distance from the front vehicle.

In connection with implementation, the compensation determination unit 200 corresponds to a controller dedicated to feedback regarding reinforcement learning of the learning device 100, and to this end may include a communication device configured to communicate with another controller or sensor, a memory configured to store an operating system, logic commands, input/output information, and the like, and at least one processor configured to perform determination, calculation, determination, and the like necessary for corresponding function control.

The inferring neural network device 300 may periodically update a parameter regarding a neural network included in the learning device 100 after stabilization of reinforcement learning regarding platooning performed by the learning device 100.

The inferring neural network device 300 may receive front image information and rear image information and may control the pertinent vehicle so as to follow the traveling trajectory of the front vehicle, on the basis of the updated parameter, without feedback from the compensation determination unit 200. The inferring neural network device 300 may output a steering control signal, a braking control signal, and an acceleration control signal as in the case of the learning device 100 such that the pertinent vehicle is controlled to follow the traveling trajectory of the front vehicle.

Accordingly, the inferring neural network device 300 may perform steering control, braking control, and acceleration control of the pertinent vehicle only through image information without additional reinforcement learning after stabilization of reinforcement learning regarding platooning, thereby reducing the amount of calculation regarding reinforcement learning of the platooning control device.

Figure 2:
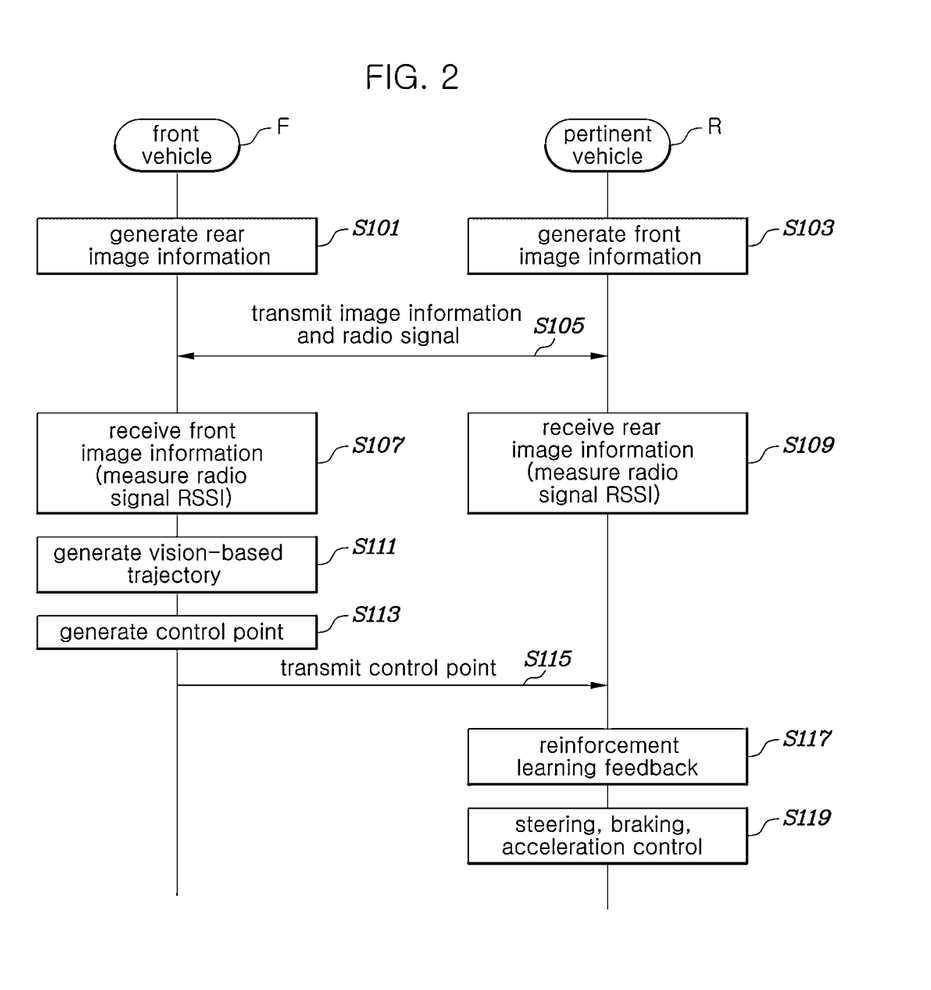
FIG. 2 is a sequence diagram illustrating a process of exchanging information between a front vehicle and a pertinent vehicle during platooning according to an embodiment of the present disclosure.

FIG. 2 is a sequence diagram illustrating a process of exchanging information between a front vehicle and a pertinent vehicle during platooning according to an embodiment of the present disclosure.

In FIG. 2, the pertinent vehicle R has the configuration described with reference to FIG. 1, and the front vehicle F is assumed to be a vehicle which is platooning together with the pertinent vehicle R, and which supports communication with the pertinent vehicle R directly or through an infrastructure or the like.

The front vehicle F may down-scale and compress image information output from a rear camera, thereby generating rear image information (S101), and the pertinent vehicle R may down-scale and compress image information output from a front camera, thereby generating front image information (S103).

The front vehicle F may transmit rear image information and a radio signal to the pertinent vehicle R, and the pertinent vehicle R may transmit front image information and a radio signal to the front vehicle F (S105).

The front vehicle F may receive the front image information and may measure the RSSI of the radio signal received from the pertinent vehicle R (S107). Likewise, the pertinent vehicle R may receive the rear image information and may measure the RSSI of the radio signal received from the front vehicle F (S109).

The front vehicle F may generate a vision-based trajectory through image information output from the rear camera and the front image information received from the pertinent vehicle R (S111), and may generate the coordinate of a control point according to the vision-based trajectory (S113).

The front vehicle F may transmit the coordinate of the control point to the pertinent vehicle R (S115).

The pertinent vehicle R may conduct feedback regarding reinforcement learning on the basis of the coordinate of the control point and a measurement value regarding the RSSI of the radio signal (S117), and may perform steering control, braking control, and acceleration control of the pertinent vehicle R according to the feedback, thereby following the traveling trajectory of the front vehicle F (S119).

Figure 3:
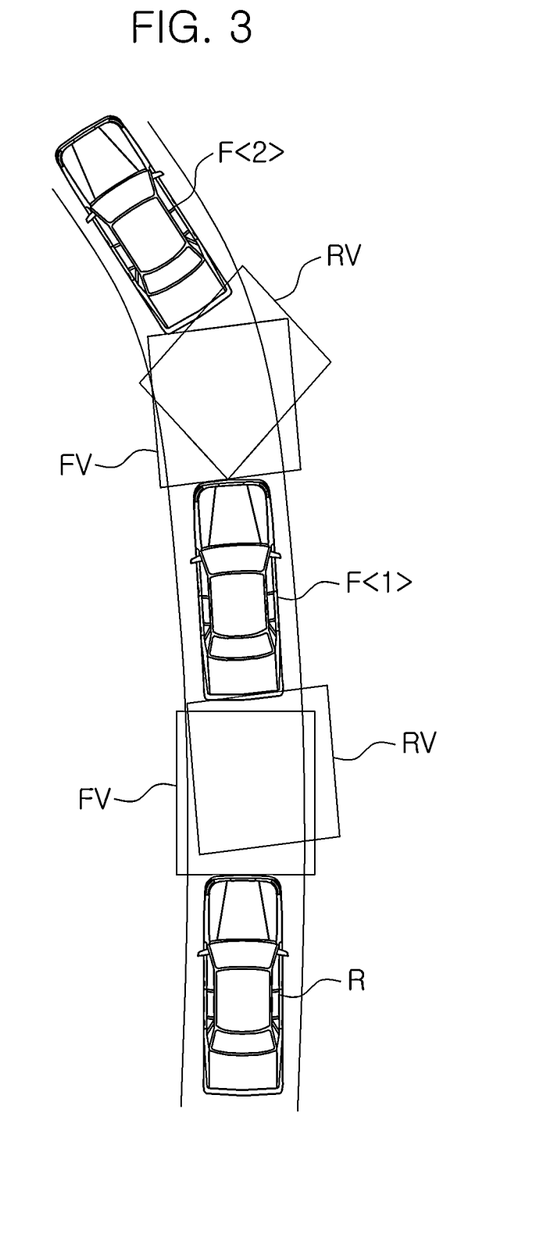
FIG. 3 illustrates front and rear images of vehicles which are platooning according to an embodiment of the present disclosure.

FIG. 3 illustrates front and rear images of vehicles which are platooning according to an embodiment of the present disclosure.

Referring to FIG. 3, a first front vehicle F<1> is positioned in front of a pertinent vehicle R, and a second front vehicle F<2> is positioned in front of the first front vehicle F<1>. A front image FV may be captured through the front camera of each vehicle, and a rear image RV may be captured through the rear camera of each vehicle.

The learning device 100 of the pertinent vehicle R may determine an overlapping part between a rear image RV of the first front vehicle F<1> and a front image FV captured by the pertinent vehicle R on the basis of front image information of the pertinent vehicle R and rear image information of the first front vehicle F<1>, and may use the determined degree of overlapping between the rear image RV and the front image V as learning data regarding reinforcement learning.

For example, the learning device 100 may determine the degree of overlapping on the basis of lanes, shapes marked on road surfaces (for example, road surface signs), feature point extraction, and the like, but this is only an example and is not limiting in any manner.

Figure 4:
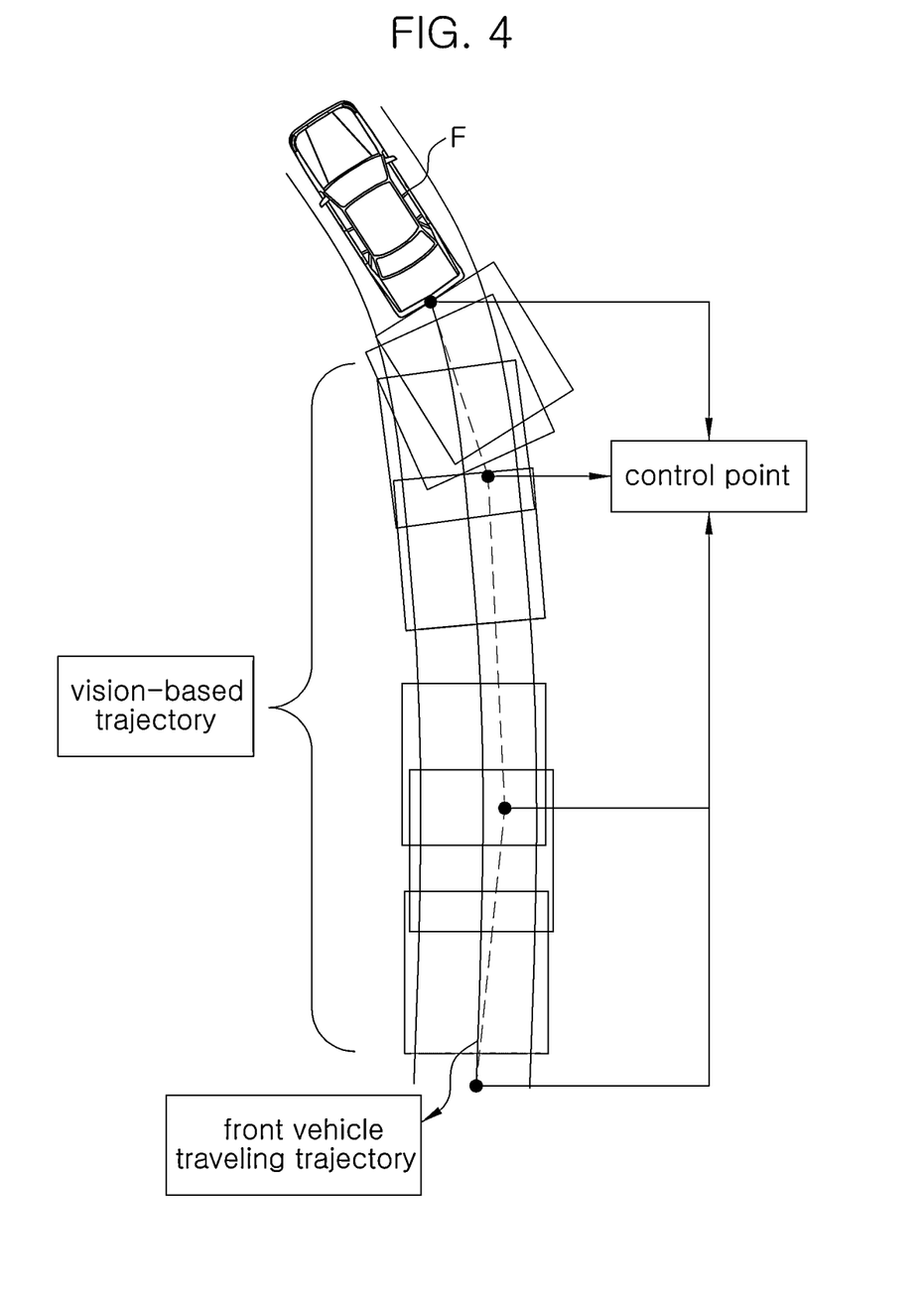
FIG. 4 illustrates an exemplary process for generating a control point regarding the traveling trajectory of a front vehicle according to an embodiment of the present disclosure.

FIG. 4 illustrates an exemplary process for generating a control point regarding the traveling trajectory of a front vehicle according to an embodiment of the present disclosure.

Referring to FIG. 4, the front vehicle F may generate a vision-based trajectory on the basis of rear image information output through a rear camera and front image information received from a rear vehicle. The front vehicle F may then generate coordinates of a control point regarding the traveling trajectory of the front vehicle through the vision-based trajectory.

Figure 5:
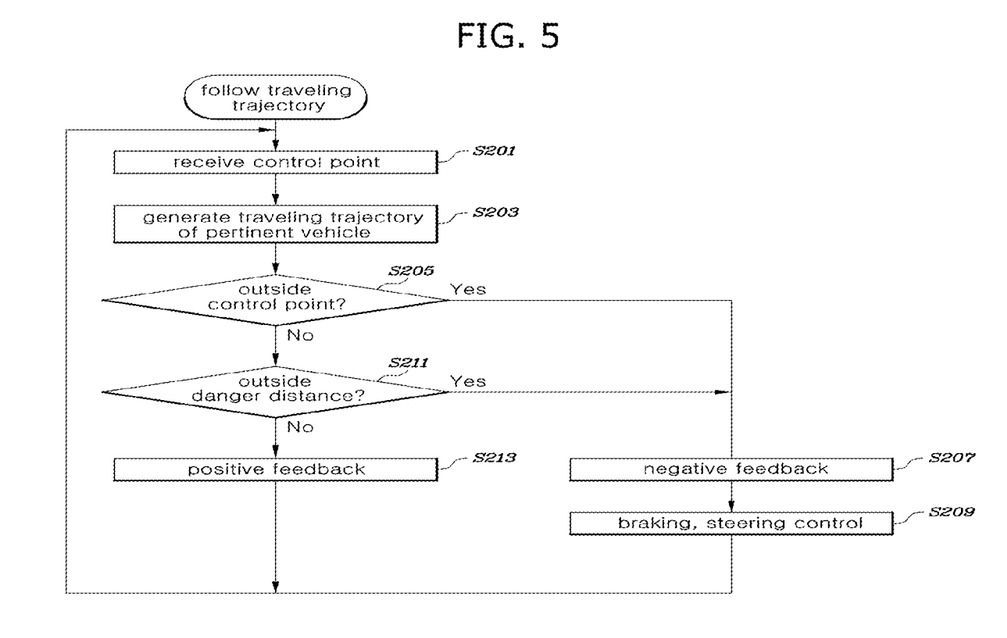
FIG. 5 is a flowchart illustrating a process of performing feedback regarding reinforcement learning on the basis of a control point regarding the traveling trajectory of a front vehicle according to an embodiment of the present disclosure.

FIG. 5 is a flowchart illustrating a process of performing feedback regarding reinforcement learning on the basis of a control point regarding the traveling trajectory of a front vehicle according to an embodiment of the present disclosure.

It will be assumed in FIG. 5 that the learning device 100 is controlling the pertinent vehicle so as to follow the traveling trajectory of the front vehicle as a result of reinforcement learning performed on the basis of image information and a feedback signal.

The compensation determination unit 200 may receive the coordinate of a control point regarding the traveling trajectory of the front vehicle from the front vehicle (S201). The platooning control device may generate the traveling trajectory of the pertinent vehicle through the coordinate of the control point regarding the traveling trajectory of the front vehicle (S203).

The compensation determination unit 200 may compare the coordinate of the pertinent vehicle with the coordinate of the control point (S205, S211), and may generate a feedback signal according to the result of comparison (S207, S213).

The compensation determination unit 200 may first determine whether the coordinate of the pertinent vehicle is on the outside of the traveling lane in comparison with the coordinate of the control point (S205).

When the coordinate of the pertinent vehicle is on the outside of the traveling lane in comparison with the coordinate of the control point (YES in S205), the compensation determination unit 200 may output a feedback signal corresponding to negative feedback. The learning device 100 may control the amount of braking of the pertinent vehicle to increase according to the negative feedback and may control the steering angle of the pertinent vehicle (S209).

When the coordinate of the pertinent vehicle is on the inside of the traveling lane in comparison with the coordinate of the control point (NO in S205), the compensation determination unit 200 may determine whether the coordinate of the pertinent vehicle is outside a preconfigured danger distance from the coordinate of the control point (S211).

When the coordinate of the pertinent vehicle is outside the preconfigured danger distance from the coordinate of the control point (YES in S211), the compensation determination unit 200 may output a feedback signal corresponding to negative feedback (S207). The learning device 100 may control the amount of braking of the pertinent vehicle to increase according to the negative feedback and may control the steering angle of the pertinent vehicle (S209).

When the coordinate of the pertinent vehicle is within the preconfigured danger distance from the coordinate of the control point (NO in S211), the compensation determination unit 200 may output a feedback signal corresponding to positive feedback (S213).

Figure 6:
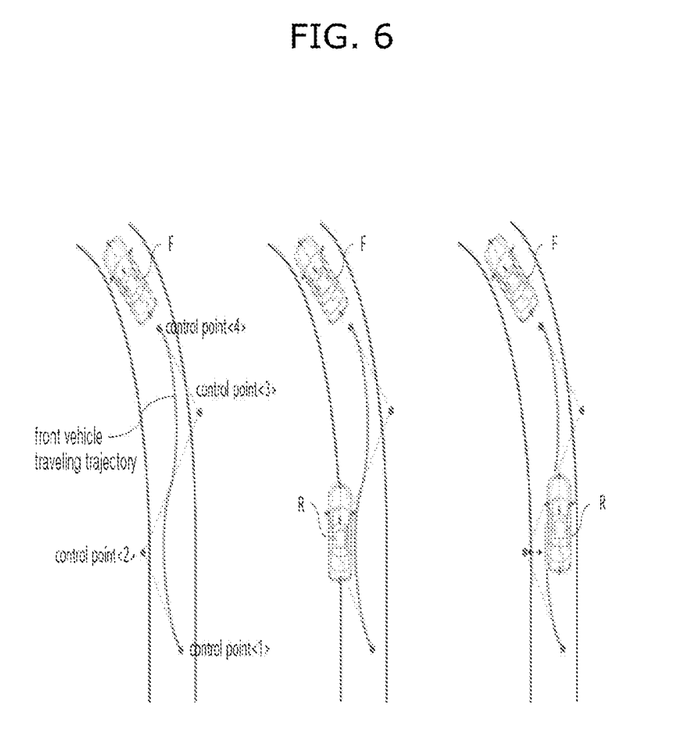
FIG. 6 illustrates a process of performing feedback according to the coordinate of the pertinent vehicle during platooning according to an embodiment of the present disclosure.

FIG. 6 illustrates a process of performing feedback according to the coordinate of the pertinent vehicle during platooning according to an embodiment of the present disclosure.

Referring to the left of FIG. 6, first to fourth control points <1:4> regarding the traveling trajectory of the front vehicle F are illustrated.

The center of FIG. 6 corresponds to a case in which the coordinate of the pertinent vehicle R is on the outside of the traveling lane in comparison with the coordinate of the second control point <2>. The compensation determination unit 200 may then output a feedback signal corresponding to negative feedback.

The right of FIG. 6 corresponds to a case in which the coordinate of the pertinent vehicle R is on the inside of the traveling lane in comparison with the coordinate of the second control point <2>, and is within a danger distance from the coordinate of the second control point <2>. The compensation determination unit 200 may then output a feedback signal corresponding to positive feedback.

Figure 7:
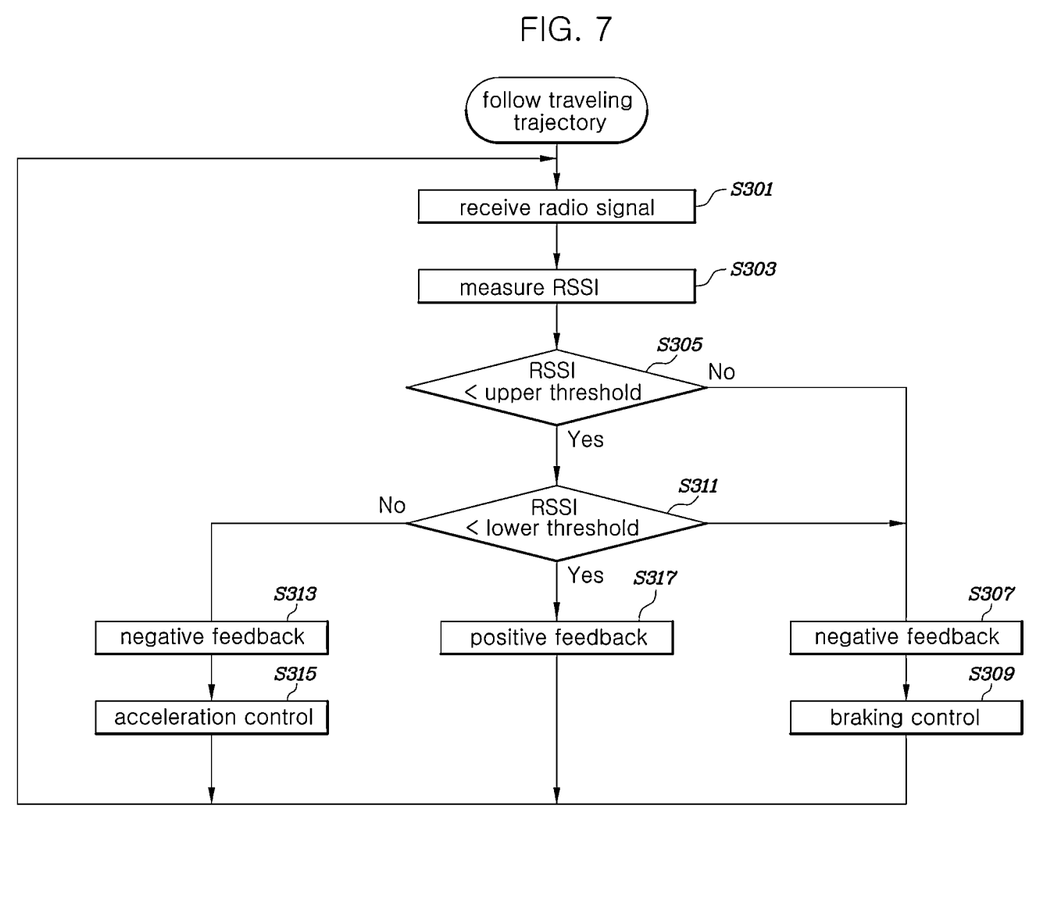
FIG. 7 is a flowchart illustrating a process of performing feedback regarding reinforcement learning on the basis of radio signal strength of a radio signal received from the front vehicle according to an embodiment of the present disclosure.

FIG. 7 is a flowchart illustrating a process of performing feedback regarding reinforcement learning on the basis of RSSI of a radio signal received from the front vehicle according to an embodiment of the present disclosure.

It will be assumed in FIG. 7 that the learning device 100 is controlling the pertinent vehicle so as to follow the traveling trajectory of the front vehicle as a result of reinforcement learning performed on the basis of image information and a feedback signal.

The compensation determination unit 200 may receive a radio signal from the front vehicle (S301), and may measure the RSSI of the radio signal (S303).

The compensation determination unit 200 may determine whether the RSSI of the radio signal is included in a preconfigured range (S305, S311), and may output a feedback signal corresponding to one of positive feedback and negative feedback according to the result of determination (S307, S313, S317).

The compensation determination unit 200 may first determine whether the RSSI of the radio signal is lower than the upper threshold of the preconfigured range (S305).

When the RSSI is higher than the upper threshold of the preconfigured range (NO in S305), the compensation determination unit 200 may output a feedback signal corresponding to negative feedback (S307). The learning device 100 may control the amount of braking of the pertinent vehicle to increase according to the negative feedback (S309).

When the RSSI is lower than the upper threshold of the preconfigured range (YES in S305), the compensation determination unit 200 may determine whether the RSSI is higher than the lower threshold of the preconfigured range (S311).

When the RSSI is lower than the lower threshold of the preconfigured range (NO in S311), the compensation determination unit 200 may output a feedback signal corresponding to negative feedback (S313). The learning device 100 may control the acceleration of the pertinent vehicle to increase according to the negative feedback (S315).

When the RSSI is higher than the lower threshold of the preconfigured range (YES in S311), the compensation determination unit 200 may output a feedback signal corresponding to positive feedback (S317).

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Further, the above detailed description should not be construed in a limitative sense, but should be considered in an illustrative sense in all aspects. The scope of the present disclosure should not be determined by reasonable interpretation of the appended claims, and all changes and modifications within the equivalent scope of the present disclosure fall within the scope of the present disclosure.

What is claimed is:

1. A platooning control device comprising:
    a learning device configured to perform reinforcement learning on the basis of image information and a feedback signal and to control a pertinent vehicle to follow a traveling trajectory of a front vehicle according to a result of the reinforcement learning; and
    a compensation determination unit configured to receive a coordinate of a control point regarding the traveling trajectory of the front vehicle from the front vehicle and to compare a coordinate of the pertinent vehicle with the coordinate of the control point, thereby generating the feedback signal,
    wherein the image information comprises front image information output from a front camera of the pertinent vehicle and rear image information output from a rear camera of the front vehicle,
    the learning device determines an overlapping part between a rear image of the front vehicle and a front image of the pertinent vehicle on the basis of the front image information and the rear image information, and determines a degree of overlapping between the rear image and the front image according to learning data regarding the reinforcement learning,
    the feedback signal indicates one of positive feedback and negative feedback regarding whether the pertinent vehicle follows the traveling trajectory of the front vehicle, and
    the control point corresponds to a point for controlling the shape of a spline curve corresponding to the traveling trajectory of the front vehicle, the spline curve corresponding to a smooth curve for expressing the traveling trajectory of the front vehicle by using a spline function.

2. The platooning control device of claim 1, wherein the learning device performs one or more of steering control, braking control, and acceleration control of the pertinent vehicle based on the feedback signal, such that the pertinent vehicle follows the traveling trajectory of the front vehicle.

3. The platooning control device of claim 1, wherein the compensation determination unit outputs the feedback signal corresponding to negative feedback when the coordinate of the pertinent vehicle is on the outside of a traveling lane in comparison with the coordinate of the control point, and
    the traveling lane refers to a lane along which the pertinent vehicle is currently traveling.

4. The platooning control device of claim 3, wherein the learning device increases an amount of braking of the pertinent vehicle when the negative feedback is output, and controls a steering angle of the pertinent vehicle so as to follow the traveling trajectory of the front vehicle.

5. The platooning control device of claim 1, wherein the compensation determination unit outputs the feedback signal corresponding to negative feedback when the coordinate of the pertinent vehicle is outside a preconfigured danger distance from the coordinate of the control point.

6. The platooning control device of claim 1, wherein the compensation determination unit outputs the feedback signal corresponding to positive feedback when the coordinate of the pertinent vehicle is on the inside of a traveling lane in comparison with the coordinate of the control point, and when the coordinate of the pertinent vehicle is within a preconfigured danger distance from the coordinate of the control point, and
    the traveling lane refers to a lane along which the pertinent vehicle is currently traveling.

7. The platooning control device of claim 1, wherein the compensation determination unit outputs the feedback signal corresponding to positive feedback when received signal strength of a radio signal received from the front vehicle is in a preconfigured range and negative feedback when the received signal strength of the radio signal received from the front vehicle is outside the preconfigured range.

8. The platooning control device of claim 7, wherein the compensation determination unit outputs the feedback signal corresponding to the positive feedback when the received signal strength is in the preconfigured range.

9. The platooning control device of claim 7, wherein the compensation determination unit outputs the feedback signal corresponding to the negative feedback when the received signal strength is higher than an upper threshold of the preconfigured range, and the learning device increases an amount of braking of the pertinent vehicle when the negative feedback is output.

10. The platooning control device of claim 7, wherein the compensation determination unit outputs the feedback signal corresponding to the negative feedback when the received signal strength is lower than a lower threshold of the preconfigured range, and the learning device increases acceleration of the pertinent vehicle when the negative feedback is output.

11. The platooning control device of claim 1, further comprising an inferring neural network device configured to update a parameter regarding a neural network included in the learning device, to receive the image information on the basis of the updated parameter, and to control the pertinent vehicle so as to follow the traveling trajectory of the front vehicle.

12. A platooning control method comprising:
controlling a pertinent vehicle so as to follow a traveling trajectory of a front vehicle according to a result of reinforcement learning performed on the basis of image information and a feedback signal;
receiving a coordinate of a control point regarding the traveling trajectory of the front vehicle from the front vehicle; and
generating the feedback signal by comparing a coordinate of the pertinent vehicle with the coordinate of the control point,
wherein the image information comprises front image information output from a front camera of the pertinent vehicle and rear image information output from a rear camera of the front vehicle,
the method further comprises: determining an overlapping part between a rear image of the front vehicle and a front image of the pertinent vehicle on the basis of the front image information and the rear image information, and determining a degree of overlapping between the rear image and the front image according to learning data regarding the reinforcement learning,
the feedback signal indicates one of positive feedback and negative feedback regarding whether the pertinent vehicle follows the traveling trajectory of the front vehicle, and
the control point corresponds to a point for controlling the shape of a spline curve corresponding to the traveling trajectory of the front vehicle.

13. The platooning control method of claim 12, further comprising:
receiving a radio signal from the front vehicle;
determining whether received signal strength of the radio signal is in a preconfigured range; and
outputting the feedback signal corresponding to one of positive feedback and negative feedback according to a result of the determining.

14. A non-transitory computer-readable recording medium in which a program for executing the platooning control method of claims 12 is recorded.

* * * * *